United States Patent [19]

Noda et al.

[11] Patent Number: 5,753,893
[45] Date of Patent: May 19, 1998

[54] ALUMINA-BASED SINTERED MATERIAL FOR CERAMIC HEATER

[75] Inventors: Yoshiro Noda, Anpachi-gun; Yoshiro Suematsu, Aichi; Toshihiko Aoyama, Aichi; Yoshitake Kawachi, Aichi, all of Japan

[73] Assignee: NGK Spark Plug Co., Ltd., Nagoya, Japan

[21] Appl. No.: 815,586

[22] Filed: Mar. 12, 1997

Related U.S. Application Data

[63] Continuation of Ser. No. 514,334, Aug. 11, 1995, abandoned.

[30] Foreign Application Priority Data

Aug. 18, 1994 [JP] Japan ................... 6-217909

[51] Int. Cl.$^6$ .................. H05B 3/10; H05B 3/38
[52] U.S. Cl. .............. 219/548; 219/553; 501/127; 501/153
[58] Field of Search .................... 219/542, 543, 219/544, 546, 548, 552, 553; 338/223, 224; 501/53, 72–73, 78, 108, 110–112, 117–122, 127, 128, 133, 153–154; 29/25.11, 25.12

[56] References Cited

U.S. PATENT DOCUMENTS

| | | | |
|---|---|---|---|
| 2,760,875 | 8/1956 | Schwartzwalder | 501/144 |
| 3,615,763 | 10/1971 | Flock | 501/128 |
| 4,601,991 | 7/1986 | Ando et al. | 501/153 |
| 5,030,602 | 7/1991 | Frey et al. | 501/127 |
| 5,306,679 | 4/1994 | Shimoda et al. | 501/153 |
| 5,424,257 | 6/1995 | Schat et al. | 501/127 |

FOREIGN PATENT DOCUMENTS

| | | |
|---|---|---|
| 41 01 537 | 8/1991 | Germany. |
| 55-121294 | 9/1980 | Japan. |
| 57-055085 | 1/1982 | Japan. |
| 60-019632 | 5/1985 | Japan. |
| 60-019633 | 5/1985 | Japan. |
| 1-225087 | 9/1989 | Japan. |
| 2-172858 | 4/1990 | Japan. |
| 3-223157 | 10/1991 | Japan. |
| 4-329289 | 11/1992 | Japan. |
| 5-51275 | 3/1993 | Japan. |
| WO-A-88 01610 | 3/1988 | WIPO. |

OTHER PUBLICATIONS

Patent Abstracts of Japan, vol. 95, No. 003, and JP-A-07-082009 (Noritake Co. Ltd; Others: 01) 28 Mar. 1995, abstract only.

European Search Report

*Primary Examiner*—Tu B. Hoang
*Attorney, Agent, or Firm*—Morrison & Foerster LLP

[57] ABSTRACT

An alumina-based sintered material for ceramic heater having a resistance heater embedded in its ceramic material. With the total amount of $Al_2O_3$, $SiO_2$, $MgO$ and $CaO$ being 100 wt %, the sintered material contains 91 to 97 wt % of $Al_2O_3$, 1 to 8 wt % of $SiO_2$, 0.2 to 1.2 wt % of $MgO$ and 0.2 to 1.2 wt % of $CaO$, the total amount of $MgO$ and $CaO$ being 0.4 to 1.8 wt %, whereas, for the total amount of $Al_2O_3$, $MgO$ and $CaO$ of 100 wt %, 0.1 to 15 wt % of (a) at least one of rare earth elements and groups IVa excluding Ti, Va and VIa of the Periodic Table are contained in the sintered material. In place of (a), 0.2 wt % or less of other elements (Na, K, Fe, Ti etc.) may also be contained in an amount not more than 0.2 wt %, calculated in terms of oxides.

6 Claims, 2 Drawing Sheets

ALUMINA-BASED SINTERED MATERIAL FOR CERAMIC HEATER

This application is a continuation of U.S. application Ser. No. 08/514,334, filed Aug. 11, 1995, now abandoned.

FIELD OF THE INVENTION

This invention relates to an alumina-based sintered material for a ceramic heater and a ceramic heater comprising the sintered material. The ceramic heater fabricated using the sintered material according to the present invention may be utilized as a heat source for an oxygen sensor and glow system for motor vehicles, ceramic heaters for heating semiconductors or heat source of a petroleum carburetor for a petroleum fan heater.

RELATED ART

The ceramic heater is stable at elevated temperatures and hence is employed for devices exposed to elevated temperatures, such as oxygen sensors or glow system for motor vehicles. As the ceramic heaters, those comprised of a heater substrate of ceramics and a heater pattern of an electrically conductive material added with ceramic additives, formed on the substrate are known. As the ceramics for heater substrates, sintered alumina products obtained by sintering a starting material of ceramics composed of a low soda alumina admixed with sintering aids are frequently employed. In addition, high-purity alumina is also employed.

With respect to this sort of heaters, there is an increasing demand for a low-resistance heater for achieving a higher temperature-increasing rate. As a starting material for forming such heating pattern, there is employed such a heater in which a ceramic additive is used in conjunction with an electrically conductive metal material, such as platinum.

BACKGROUND OF THE INVENTION

The above-described conventional ceramic heater, fabricated from the ceramics for heater substrates and a starting material for forming a heating pattern, suffers from a problem of inferior adhesion between the substrate and the heating pattern. In addition, if the ceramic heater is used at an elevated temperature as is the case with an oxygen sensor for a motor vehicle, a phenomenon called migration in which cations of alkali metals or alkaline earth metals contained in alumina as impurities migrate, is produced. These cations are segregated towards a cathode terminal such that the heating pattern is deteriorated with the lapse of time and elevated in resistance value thus occasionally leading to breakage of the heating pattern and/or cracks formed in the ceramic substrate. Also in the case where the metal constituting the heating pattern is Pt, migration of Pt occurs at a high temperature and voltage, ultimately leading to exhaustion of Pt and breakage of the heating pattern.

For obviating the above problem, attempts have hitherto been made in improving the ceramic heaters in both aspects of the structure and the materials, that is the heater structure, the ceramics constituting the substrate and the electrically conductive material constituting the heating pattern. Examples of the prior-art proposal include (1) JP Patent Kokai Publication JP-A-4-329289, (2) JP Patent Kokai Publication JP-A-5-51275, (3) JP Patent Kokai Publication JP-A-3-223157 and (4) JP Patent Kokai Publication JP-A-1-225087. Among these, it is intended in (1) to prolong the heater service life under high temperature environments by improving the heater pattern. This prior-art proposal does not provide fundamental solution from the aspect of the ceramics or the starting materials, such as electrically conductive materials.

On the other hand, it is intended in (2) and (3) to improve according to the aspect of the starting materials. Thus the quantity of components susceptible to migration is diminished to as small a value as possible for preventing line breakage or heater deterioration due to the migration. However, these components are contained as impurities so that there is naturally a certain limit in lowering the amount of these components and hence no expectation can be made of achieving a drastic improvement in the heater service life. In addition, it is intended in (2) to improve the adhesion by employing a common basic (green) material consisting in an electrically conductive material of a heater pattern admixed with a material same/similar to the ceramics of the heater substrate. However, this solution offers a difficulty in controlling the heater resistance.

SUMMARY OF THE DISCLOSURE

It is therefore an object of the present invention to solve the above-mentioned problems inherent in the conventional ceramic heaters. It is a more specific object of the present invention to provide an alumina-based sintered material for use in a ceramic heater, referred to herein occasionally as a "sintered material", based on which a dense sintered body with a relative density exceeding 94% can be produced by specifying the starting material and the composition thereof and by which a ceramic heater exhibiting superior durability and superior adhesion between the ceramics of the substrate and the electrical resistance heater.

In one aspect of the present invention, there is provided an alumina-based sintered material for a ceramic heater having a resistance heater embedded in a ceramic material thereof, wherein, with a total amount of $Al_2O_3$, $SiO_2$, MgO and CaO being 100 wt %, the sintered material contains 91 to 97 wt % of $Al_2O_3$, 1 to 8 wt % of $SiO_2$, 0.2 to 1.2 wt % of MgO and 0.2 to 1.2 wt % of CaO, with the total amount of MgO and CaO being 0.4 to 1.8 wt %, wherein, based on a total amount of $Al_2O_3$, $SiO_2$, MgO and CaO being 100 wt %, the sintered material contains not more than 0.2 wt % of elements, and oxides thereof other than Al, Si, Mg and Ca, and wherein rare earth elements, elements of the group IVa excepting Ti, group Va and the group VIa of the Periodic Table and oxides thereof are excluded from the firstly-stated elements, and in that a ceramic heater fabricated using the sintered material has a durability in terms of the time elapsed until breakage of a test heater when it is electrically heated to a surface temperature of 1100° C. under an ambient atmosphere on current conduction through the heater, amounting to 600 hours or more, and has an adhesive strength of a terminal bonded with a brazing material of not lower than 1.0 kg/mm².

According to a second aspect, with a total amount of $Al_2O_3$, $SiO_2$, MgO and CaO of 100 wt %, the sum of the amounts of MgO and CaO is 1.1 to 1.8 wt %, with an adhesive strength being not lower than 1.5 kg/mm².

According to a third aspect, there is provided an alumina-based sintered material for ceramic heater having a resistance heater embedded in a ceramics material thereof, wherein, with a total amount of $Al_2O_3$, $SiO_2$, MgO and CaO being 100 wt %, the sintered material contains 91 to 97 wt % of $Al_2O_3$, 1 to 8 wt % of $SiO_2$, 0.2 to 1.2 wt % of MgO and 0.2 to 1.2 wt % of CaO, with a total amount of MgO and CaO being 0.4 to 1.8 wt %, and wherein, based on a total amount of $Al_2O_3$, $SiO_2$, MgO and CaO being 100 wt %, the sintered material contains 0.1 to 15 wt % of at least one selected from the group consisting of rare earth elements and elements of the group IVa excluding Ti, the groups Va and VIa of the Periodic Table, calculated as oxides.

According to a fourth aspect, there is provided a ceramic heater fabricated using the sintered material, which has a durability equal to 700 hours or more and an adhesive strength of a terminal bonded with a brazing material being not lower than 1.75 kg/mm².

According to a fifth aspect, there is provided a ceramic heater comprising the alumina-based sintered material according to the first to fourth aspects.

If the amount of $Al_2O_3$ is less than 91 wt %, the proportion of additives or aids is relatively increased to show a tendency of insufficient heater durability, although a superior adhesion between the ceramics and the resistance heater may be achieved. If the amount exceeds 97 wt %, the proportion of the additives or aids is relatively lowered to tend to lower the adhesion, even though a superior durability may be achieved.

In order to provide a sintering material having superior sinterability, which can be evaluated in terms of relative density, durability and adhesion, it is necessary for the sintered material to contain "pre-determined amounts of $SiO_2$, MgO and CaO". If these amounts are excessive, durability tends to be lowered. If the "sum of MgO and CaO" is less than 0.4 wt %, sinterability and adhesion tend to be lowered, whereas, if the sum exceeds 1.8 wt %, durability tends to be lowered.

If the total amount of "the elements other than Al, Si, Mg and Ca, and oxides of said elements, wherein rare earth elements, elements of the group IVa excepting Ti, group Va and the group VIa of the Periodic Table and oxides thereof are excluded, the firstly-stated elements being referred to hereinafter as "components A other than major components", exceeds 0.2 wt %, durability tends to be lowered. The "components A other than major components" may be enumerated by, for example, Na, K, Fe, Ti, Mn, Cu, S and Ga and oxides thereof. These elements and oxides thereof may be inherently contained in the starting materials as impurities or mixed into the starting material at the time of preparation (e.g., Mn, Cu, S, Ga, etc.), the amount of which is preferred to be kept as small as possible. On the other hand, $Na_2O$, $K_2O$, $Fe_2O_3$ and/or $TiO_2$, etc. for example, may be separately added and contained in minor quantities comprised within the above-mentioned range, (preferably of 0.03 wt % or above calculated as exides) for improving sinterability.

In the third aspect, if the "at least one of the rare earth elements and elements of the group IVa excluding Ti, the groups Va and VIa of the Periodic Table", referred to herein as "rare earth elements or the like", are contained in an amount in a range of 0.1 to 15 wt %, calculated as oxides, part of these elements are present in the grain boundary to obstruct the migration of tungsten or the like for further improving durability of the heater. In addition, adhesion may also be improved by anchoring effect of the above elements in metallized portions of tungsten, etc. The rare earth elements may be enumerated by the elements of the group IIIa, Sc, Y and lanthanoids La (57) to Lu(71), namely Y, Sc, La, Ce, Pr, Nd, Gd, Tb, Dy, Er and Yb, etc. In the third aspect, as in the first aspect, it is more preferred that the total amount of the "components A other than the main components", such as Na, K, Fe, Ti, etc. be not more than 0.2 wt %. Also in the third aspect, as in the second aspect, the total amount of MgO and CaG is preferably 1.1 to 1.8 wt %.

The most outstanding feature of the ceramic heater produced using the sintered material of the present invention is its superior durability. The term "durability" used in the present invention is evaluated in terms of the time which elapses until breakage of a heater upon heating test by heating the heater by allowing electric D.C. current to flow through the heater under an ambient atmosphere to an elevated surface temperature of 1100° C.

The "periodic Table" herein means the International Periodic Table by IUPAC. The group IVa denotes elements Ti, Zr and Hf, while the group Va denotes V, Nb and Ta and the group VIa denotes Cr, Mo and W.

For the resistance heater (thermo-resistor), metals such as platinum Pt, tungsten W or molybdenum Mo, etc. may be employed without limitations.

As discussed in, for example, JP Patent Kokai Publication JP-A-4-329289 or JP Patent Kokai publication JP-A-5-51275, the mechanism of heater breakage may be generally understood in the following manner.

By migration of trace components present in the sintered material, cations of alkali metals or alkaline earth metals are caused to move (i.e., migrate) towards the cathode, while oxygen ions are caused to move towards the anode so as to be reacted with metals constituting the electrode, such that, if, e.g., tungsten is employed as such metal, tungsten oxide is generated. At this time, the ceramic material of the substrate suffers cracks caused by volumetric expansion. On the other hand, oxidation proceeds rapidly by intrusion of atmospheric oxygen via the cracks, resulting in peeling/scaling off and/or collapse of the heating pattern inclusive of the electrode.

On the other hand, if the sintered material of the present invention is employed, the heater exhibits superior durability, and the mechanism which ultimately leads to breakage differs from what has been depicted above. That is, the mechanism leading to breakage is presumably such that the resistance heater, such as tungsten, is migrated in a high-temperature atmosphere under a high dc voltage from a high potential side towards a low potential side, as a result of which the amount of tungsten is diminished at the anode side to cause breakage, i.e., line disruption caused by exhaustion. This is supported by the fact that oxidation of tungsten or the like, as mentioned in the above prior-art publications, has not been observed until breakage has occurred. Also, it is thought that in the case where the metal constituting the resistance heater is Pt, migration of Pt occurs at a high temperature and voltage, ultimately leading to exhaustion of Pt and breakage of the heating pattern.

The meritorious effects of the present invention will be summarized hereinbelow.

With the sintered material of the first aspect, the amounts of respective components of ceramics, inclusive of Na, etc. and oxides thereof, contained in very small amounts, are specified, whereby a ceramic heater having a high relative density and superior durability (time elapsed until breakage) and adhesion between the ceramic substrate and the electrically conductive material constituting the resistance heater, such as tungsten, may be produced. In the second aspect, the total amount of MgO and CaO as the components of the sintered material is specified so that a heater having adhesion better than that achieved with the first aspect may be achieved. With the sintered material of the third aspect, a ceramic heater may be achieved by adding specified amounts of rare earth elements or the like for providing a ceramic heater having particularly superior durability and adhesive properties. In the fourth aspect, a ceramic heater may be provided which is superior in durability and having an adhesive strength higher than a specified value.

Explanation of Numerals 1a, 1b, 1a', 1b'; ceramic substrates; 2: heating element portion at a forward portion of a ceramic heater; 3a, 3b, 3a', 3b': anode and cathode terminals; 4a, 4b, 4a', 4b': leads.

DESCRIPTION OF PREFERRED EMBODIMENTS

In the following preferred embodiments of the present invention will be elucidated.

For suppressing tungsten migration as described above, it is effective to lower the amounts of alkali metals and oxides thereof to as small values as possible considering the sinterability, and to raise the viscosity of the grain boundary operating as migration paths or to reduce pores in the grain boundary to raise the denseness of the sintered body to higher than a pre-set value (94%), provided that the amounts of addition of MgO and CaO as sintering aids are matched to the pre-determined conditions. Addition of rare earth elements, etc. is also effective to suppress migration possibly because these elements present in the grain boundary obstructs the tungsten migration.

On the other hand, the heater is required to exhibit not only durability (time elapsed until breakage) but also high adhesion between the substrate ceramics and metal components constituting the resistance heater. In particular, in terminal portions for current conduction to the resistance heater, the terminals for leading out lead wires are bonded by brazing after nickel plating. If adhesion falls short, the terminal portions tend to peeling/scaling off from the substrate. For preventing such scaling off, the adhesion strength, that is the jointing strength between the resistance heater at the terminals portions and the substrate ceramic, is preferably 1 kg/mm² or higher. If current is supplied to a press-contact surface portion of the terminal portion contacting with an opposing external terminal, without brazing the lead wire lead-out terminal to the terminal portion, abrasion to the metallized layer in the terminal portion is increased significantly, so that scaling off is likely to be caused. For this reason, high adhesion strength is similarly desired.

Oxides of Na, K, Fe and/or Ti serve to provide an improved sinterability. Preferably, the "components A other than major components" should be present in an amount of 0.01 wt % or more, more preferably 0.05 to 0.12 wt %. Those "components A other than major components" other than Na, K, Fe, and Ti should be kept in a least possible amount, e.g., 0.05 wt % or less would be preferred.

EXAMPLES

By Experimental Examples and Comparative Experimental Examples, the performance of the ceramic heater fabricated using the alumina-based sintered material and other components according to the present invention will be explained in detail.

(1) Construction of a Ceramic Heater
(2) Planar Plate-Shaped Heater

Figure 1:
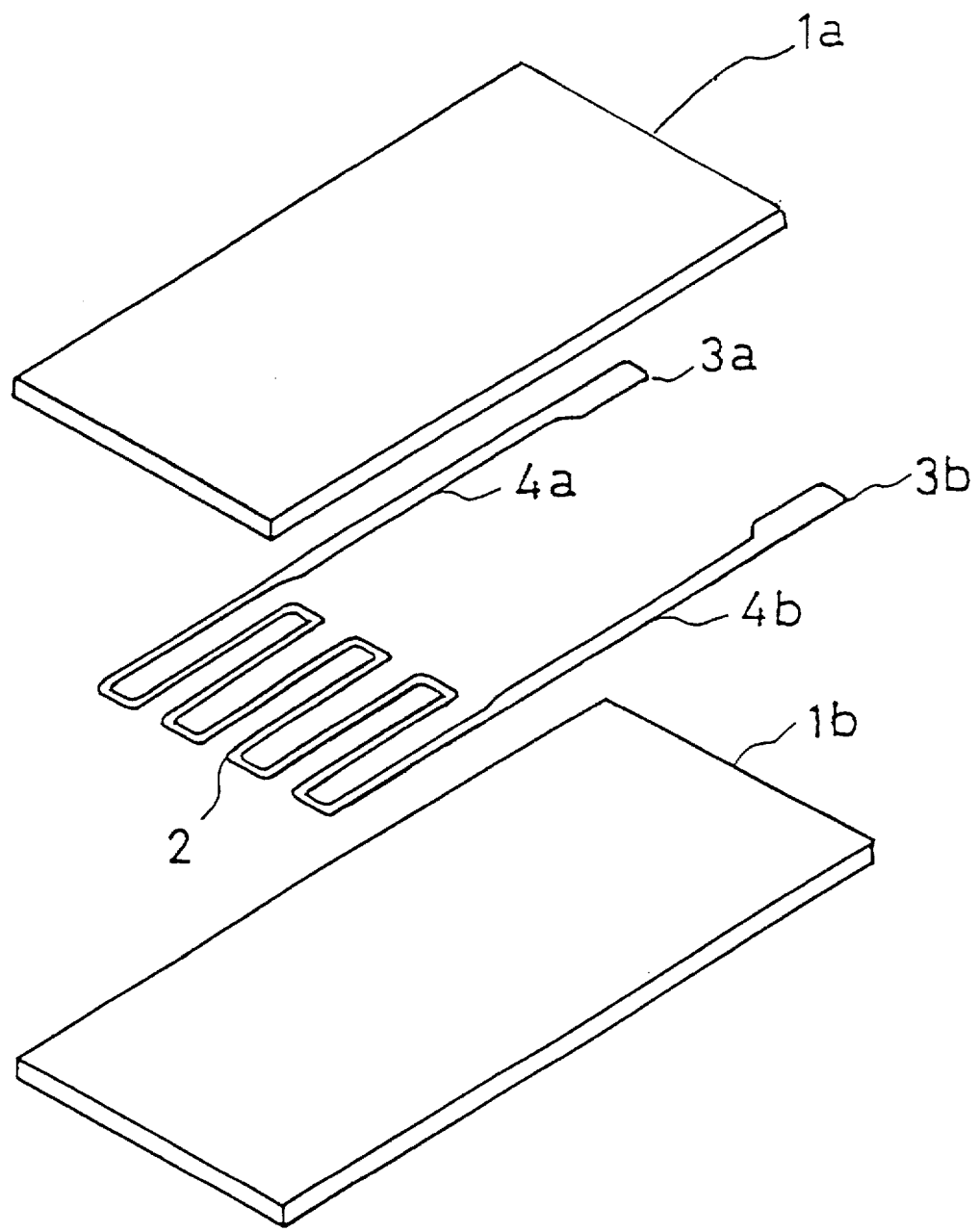
FIG. 1 is an explode perspective view showing an embodiment of a ceramic heater fabricated using an alumina-based sintered material according to the present invention.

In FIG. 1, an embodiment of a planar plate-shaped heater is shown in an exploded perspective view. This heater is comprised of a tungsten resistance heater (thermo-resistor) provided between alumina ceramic substrates 1a, 1b. The resistance heater is comprised of a heating element portion 2 at the forward end of the ceramic heater, an anode side terminal 3a and a cathode side terminal 3b provided at the rear end of the ceramic heater so as to be connected to a power source, and lead wires 4a, 4b interconnecting the heating element portion 2 and the terminals 3a, 3b.

(B) Round-Rod Shaped Heater

Figure 2:
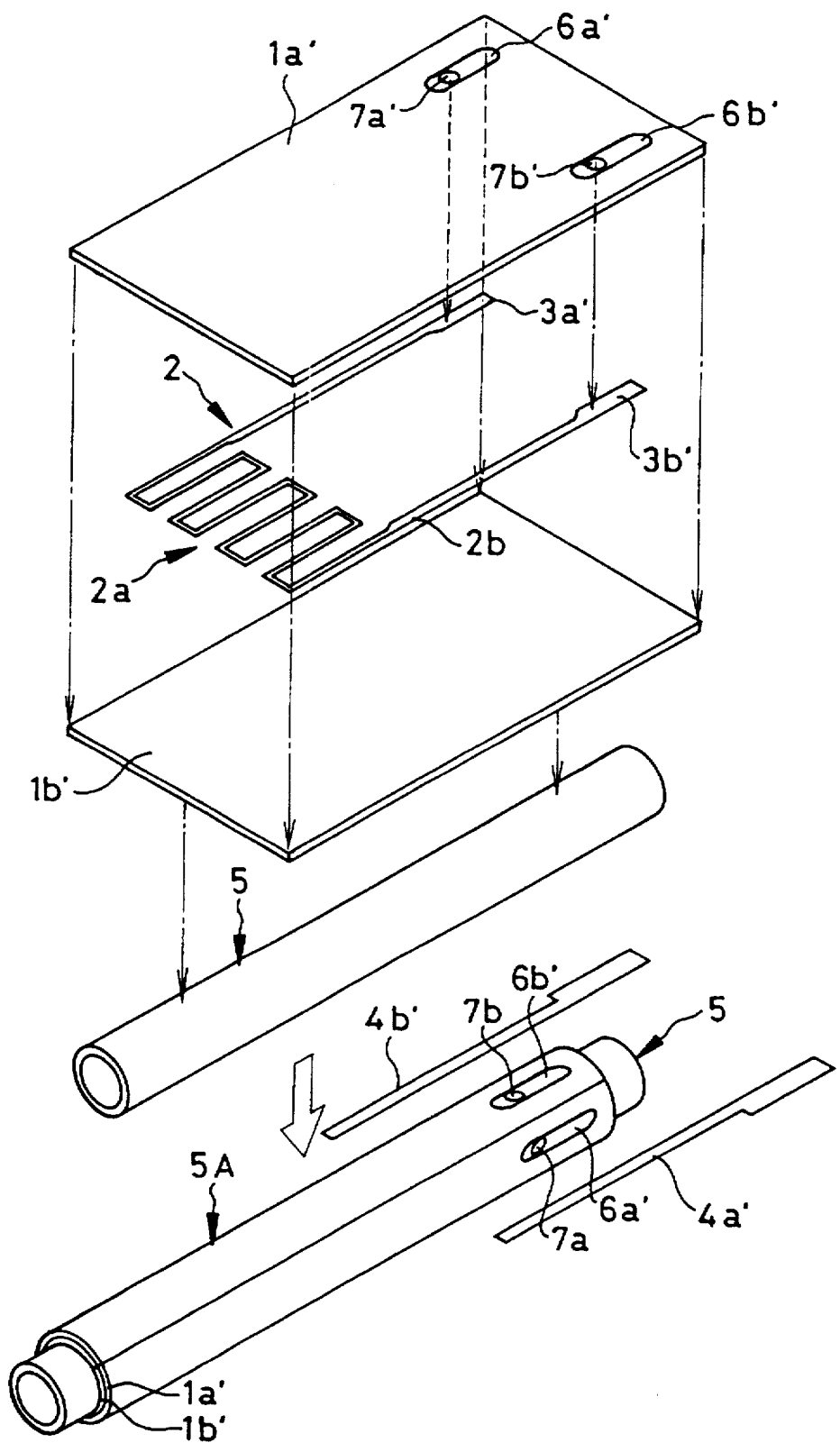
FIG. 2 illustrates an embodiment of a rod-shaped heater partially in an exploded and developed state.

FIG. 2 shows an embodiment of a round-rod shaped heater. The heater is comprised of a tungsten resistance heater provided between ceramic substrates 1a', 1b' of an alumina-based material. A sheet 1b' is press-bonded to a W pattern 2 printed on the substrate 1a'. The press-bonded laminated sheets 1a', 1b' are wrapped around an alumina rod 5 to form a round-rod shaped assembly 5A, as shown at a lower part of FIG. 2.

The W-pattern 2, as a resistance heater, is electrically connected to metallized terminals 6a', 6b' via through holes 7a', 7b while being connected to the power source via leads 4a', 4b'.

(2) Method for Fabricating a Ceramic Heater

The ceramic substrates 1a, 1a', 1b, 1b' were fabricated from green sheets by the following steps.

(i) Fabrication of Green Sheets
(A) Planar Plate-Shaped Heater

To 100 parts by weight of a composition composed of powders of $Al_2O_3$, having a purity of 99.9% and a mean particle size of 1.8 µm, $SiO_2$ as a sintering aid, having a purity of 99.9% and a mean particle size of 1.4 µm, $CaCO_3$ as (converted to) CaO, having a purity of 99.9% and a mean particle size of 3.2 µm, $MgCO_3$ as MgO, having a purity of 99.9% and a mean particle size of 4.1 µm and of other trace components to be added as the occasion may require, in suitable proportions, were added 8 parts by weight of polyvinyl butyryl , 4 parts by weight of DBP, 18 parts by weight of methylethylketone and 70 parts by weight of toluene, and the resulting mass was ball-milled to a slurry. The slurry was then deformed under reduced pressure and two green sheets each having a thickness of 0.4 mm were fabricated by the Doctor blade method. For the compositions of Experimental Samples 12 to 21 and the Comparative Samples C8 to C10, pre-set amounts of rare-earth elements having a purity of 99.9% and a mean particle size of 1.5 µm, were added to the composition of the Experimental Sample 1.

The powder constituents were prepared and formulated using a pot having the same composition of main constituents as that of the Experimental Sample 1 shown in Table 1 below and a ball mill employing spherical balls. The sintering aids and the rare-earth elements may be added in the form of alkoxides or the like.

The resistance heater 21 is comprised of a heater portion 21, an anode terminal 3a, a cathode terminal 3b and lead wires 4a, 4b interconnecting the heater portion 21 with the terminals 3a, 3b. The terminals 3a, 3b were each 1×4 mm in size.

(B) Fabrication of Green Sheets for Round-Rod-Shaped Heaters

As a slurry for the green sheets, the slurry used in the fabrication for the Experimental Samples 1, 2 and 3 in Table 1 was used, pursuant to the case of fabrication of the planar plate-shaped heater (A). From this slurry, two kinds of sheets, namely a sheet 1a' having a thickness of 0.3 mm and a sheet 1b' having a thickness of 0.06 mm, were fabricated by a Doctor blade method.

(ii) Printing of Heating Patterns (A) Planar Plate-Shaped Heater

On the surface of a sole green sheet, fabricated as described above, a tungsten paste prepared in advance was screen-printed by a thick film printing method to a thickness of 30 μm to from a resistance heater.

(B) Round-Rod Shaped Heater

Four different sorts of resistance heaters with varying thicknesses of the metallization of 18 μm, 23 μm, 28 μm and 33 μm, were formed by printing by the thick film method on the surface of the sheet $1a'$ by changing viscosity of a metallized ink or thickness of an emulsified paste layer of a screen mask. The resistance heater is fabricated by forming, on one surface of the sheet $1a'$, a heater portion $2a$, an anode terminal $3a'$, a cathode terminal $3b'$, anode terminal-and cathode terminal-leads $2b$ electrically interconnecting the heater and both the terminals, by forming, on an opposite surface of the sheet $1a'$, an anode terminal $6a'$ and a cathode terminal $6b'$, and by forming an anode through-hole $7a'$ and a cathode through-hole $7b'$ through the sheet $1a'$ for electrically interconnecting the cathode and anode terminals $3a'$, $3b'$ and terminals $6a'$, $6b'$.

(iii) Lamination of Green Sheets (A) Planar Plate-Shaped Heater

An other green sheet was press-bonded and laminated to a green sheet, having a resistance heater printed thereon, to produce a heater preform.

The other green sheet covers the resistance heater up to its leads $4a$, $4b$ without covering the terminals $3a$, $3b$.

(B) Round-Rod Shaped Heater

For fabricating the round-rod-shaped heater, the sheet $1b'$ is press-bonded to one surface of the sheet $1a'$ and an alumina paste, as a common base material, is applied to a surface of the sheet $1b'$, which is free from being press-bonded to the sheet $1a'$. The assembly thus produced is wrapped around the alumina rod 5, with a surface coated with the alumina paste facing the alumina rod, shown in FIG. 2, for fabricating a round-rod-shaped green heater 5A (not yet sintered).

(iv) Sintering of the Heater Preform (common to both (A) Planar Plate-Shaped Heater and (B) Round-Rod Shaped Heater)

The heater preform was heated to 250° C. for being freed of binder and solvent, and was subsequently sintered in a hydrogen atmosphere at 1550° C. to produce (A) planar plate-shaped ceramic heater elements, and (B) round-rod-shaped heater elements in which two ceramic substrates $1a$, $1b$ and the resistance heater are unified together.

(v) Brazing of a Lead-Wire Lead-Out Terminal (A) Planar Plate-Shaped Heater

Both ends of the terminals $3a$, $3b$ of a planar plate-shaped ceramic heater element were nickel-plated, and lead wire lead-out terminals were bonded thereto using a brazing material. The bonding part had an area of 4 mm² (1 mm in width by 4 mm in length).

(B) Round-Rod Shaped Heater

Both ends of the terminals $6a'$, $6b'$ of a sintered round-rod-shaped ceramic heater element were nickel-plated, and lead wire lead-out terminals $4a'$, $4b'$ were bonded thereto using a brazing material in the same way as described above.

(3) Evaluation of Performance of Ceramic Heaters (i) Test on Heater Durability (Basic Technique)

The dc current was applied to the heater in an ambient atmosphere so that the surface temperature of the heater reached 1100°, and the time which elapsed until breakage of the heater was measured. In order for the surface temperature of the heater to reach 1100° C., an applied voltage of 20 VDC to the heater under a room ambient temperature atmosphere, or an applied voltage on the order of 10 VDC under an ambient temperature of 1000° C. is required. Although the surface temperature of the heater is preferably measured using a non-contact-type thermometer, it is also possible to carry out measurement with a thermocouple kept in contact with the heater surface.

(A) Planar Plate-Shaped Heater

The durability test for the planar plate-shaped heater is carried out in accordance with the above-mentioned basic technique.

(B) Durability Test for the Round-Rod-Shaped Heater

The durability test was carried out for the four sorts of heater resistances of 4.5 ohm, 5.2 ohm, 6.0 ohm and 6.7 ohm, using varying values of the applied voltage.

The voltage was set so that the heater surface temperature reached approximately 1100° C.

The surface temperature was set by measuring the relation between the voltage and the surface temperature with a thermocouple being previously bonded to the heat generating portion of the heater and by varying the voltage.

(ii) Test on Tight Adhesion Between Ceramics and Resistance Heater (Common to both (A) and (B))

The lead wire lead-out terminal s were brazed, and a main body of the heater was secured using a chuck. The lead terminals were pulled along a line of extension of the terminals in a direction parallel to the ceramic substrate at a rate of traction of 0.05 cm/min, and the load at the time of peeling off of the terminals from the ceramics and the area of the peeled metallized portions were measured in order to find the ratio of the load to the peeled area (load/peeled area) which is to be used as a measure of the adhesive strength per unit area.

(4) Evaluation of Performance of Ceramic Substrate (Common to both (A) and (B))

i) Analyses of Composition (common to both (A) and (B))

Ceramic green sheets were sintered under the same conditions for respective heater preform samples and the proportions of respective elements of the resulting sintered articles, calculated in terms of oxides, were obtained. The results are shown in Tables 1 to 6. The amounts of the components $Al_2O_3$, $SiO_2$, MgO and CaO are indicated in terms of converted percentage values related to the total amount of these components being 100%.

(ii) Measurement of Relative Density (Common to (A) and (B))

Each ceramic green sheet was punched to a size 50 mm by 50 mm. Each punched square-shaped sample was heated at 250° C. for being freed of binder and solvent, and was sintered at 1550° C. in a hydrogen atmosphere. The density of the resulting sintered product was measured by the Archimedes method and divided by a theoretical density to find the relative density. The theoretical density was calculated by a mixing rule.

The measured results of the relative density, durability and adhesion tightness are also shown in Tables 1 to 6.

(A) Planar Plate-Shaped Heater

It is seen from the results of Table 1 that the sintered material of the present invention and the heater prepared therefrom are superior in relative density, durability and theoretical strength which amounted to 94.8% or higher, 600 to 700 hours and 4.2 kg (1.1 kg/mm²) or higher, respectively. In particular, with the sum of CaO and MgO ranging between 1.1 and 1.8 wt %, the sintered material and the heater are further superior in characteristics, with the adhesive strength being 6.3 kg (1.6 kg/mm²) or higher.

It is also seen from the results of Table 2 that, with the Comparative Sample C1 for which components A other than the major elements and the sum of MgO and CaO exceed the upper limits, the durability is inferior, although the adhesion is excellent, and that, with the Comparative Sample C2 for which only components A other than major elements exceed the upper limit, Comparative Sample C3 for which only the sum of MgO and CaO exceeds the upper limit and with the Comparative Sample C4 for which each of MgO and CaO is lower than their lower limits, respectively, with the total amount being also less than the lower limit, the durability is inferior. On the other hand, with the Comparative Sample C5 for which MgO exceeds the upper limit and CaO is lower than its lower limit, both durability and adhesion are significantly lowered, whereas, with the Comparative Sample C6 with CaO exceeding its upper limit, and with the Comparative Sample C7 for which $Al_2O_3$ exceeds its upper limit, with the amount of the sintering aids being extremely small, the adhesion strength is further lowered and is less than 1 kg (0.25 kg/mm$^2$), although the durability remains satisfactory.

It is also seen from the results of Tables 3 and 4 that, if oxides of Y, Zr, Hf and Nb, oxides or mixtures thereof are used in an amount of 0.5 to 13 wt %, the relative density and durability are not lower than 94.7% and 700 to 800 hours, respectively, whereas, with the Experimental Sample 21 having the least amount of addition of the rare earth elements or mixtures thereof, an excellent adhesion value of 7.1 kg (1.8 kg/mm$^2$) is achieved, such that the sintered material and the heater are more excellent on the whole than those of the first aspect shown in Table 1. In the Comparative Sample C8, in which the amount of addition of the rare earth elements etc. is lower than its lower limit value, the results are satisfactory on the whole, although the adhesion is slightly inferior to that of the Experimental Samples 12 to 21 Conversely, in the Comparative Samples C9 and C10, in which the amount of addition of rare elements etc. exceeds its upper limit value, the relative density, durability and adhesion are remarkably lowered, especially if the rare earth elements etc. are added in larger quantities.

(B) Round-Rod Shaped Heater

The results of experiments on the round-rod-shaped heaters are shown in Tables 5 and 6 (Experimental Samples 22 to 24 and Comparative Sample C11 to 12 and C13 to C14). With Samples 22 to 24, the durability exceeds 600 hours, while the adhesion also has sufficiently high values of 1.5 to 1.8 kg/mm$^2$. Conversely, the Comparative Samples are all inferior in durability, while Comparative Samples C13 and C14 are also inferior in adhesion.

Although the round-rod-shaped ceramic heater in the form of a circular tube is preferred in view of mechanical strength, the center round rod may also be a solid cylindrical rod.

It should be noted that modification apparent in the art may be done without departing from the gist and scope of the present invention as herein disclosed and claimed.

TABLE 1

| | Oxides of major elements | | | | CaO + MgO | Oxides of elements other than major elements | | | | | Relative | Durability | Adhesion |
|---|---|---|---|---|---|---|---|---|---|---|---|---|---|
| | $Al_2O_3$ | $SiO_2$ | MgO | CaO | (wt %) | $Na_2O$ | $K_2O$ | $Fe_2O_3$ | $TiO_2$ | total | density(%) | (Hr) | (kg/mm$^2$) |
| Samples | | | | | | | | | | | | | |
| 1 | 93.40 | 5.45 | 0.23 | 0.92 | 1.15 | 0.04 | 0.03 | 0.04 | 0.01 | 0.12 | 96.0 | >600 | 1.7 |
| 2 | 92.96 | 5.34 | 0.78 | 0.92 | 1.70 | 0.04 | 0.03 | 0.04 | 0.02 | 0.13 | 95.7 | >600 | 1.8 |
| 3 | 95.07 | 3.63 | 0.89 | 0.41 | 1.30 | 0.04 | 0.03 | 0.04 | — | 0.11 | 96.4 | >600 | 1.6 |
| 4 | 92.10 | 6.38 | 0.91 | 0.61 | 1.52 | 0.04 | 0.03 | 0.06 | 0.03 | 0.16 | 95.3 | >600 | 2.0 |
| 5 | 93.24 | 5.46 | 0.38 | 0.92 | 1.30 | 0.04 | 0.03 | 0.04 | 0.01 | 0.12 | 95.9 | >600 | 1.8 |
| 6 | 94.66 | 3.64 | 0.78 | 0.92 | 1.70 | 0.04 | 0.03 | 0.04 | — | 0.11 | 96.2 | >600 | 1.6 |
| 7 | 91.50 | 6.70 | 0.60 | 1.20 | 1.80 | 0.04 | 0.03 | 0.06 | 0.03 | 0.16 | 94.8 | >600 | 2.2 |
| 8 | 96.01 | 2.97 | 0.50 | 0.52 | 1.02 | 0.04 | 0.03 | 0.04 | — | 0.11 | 96.6 | >600 | 1.4 |
| 9 | 93.40 | 5.45 | 0.92 | 0.23 | 1.15 | 0.04 | 0.03 | 0.04 | — | 0.11 | 96.2 | >600 | 1.7 |
| 10 | 93.06 | 6.48 | 0.23 | 0.23 | 0.46 | 0.04 | 0.03 | 0.04 | 0.02 | 0.13 | 95.6 | >600 | 1.3 |
| 11 | 96.27 | 3.27 | 0.23 | 0.23 | 0.46 | 0.04 | 0.03 | 0.04 | — | 0.11 | 96.3 | >600 | 1.1 |
| 11A | 92.70 | 6.40 | 0.30 | 0.60 | 0.90 | 0.04 | 0.05 | 0.08 | 0.03 | 0.20 | 96.9 | >600 | 2.0 |
| 11B | 93.03 | 5.80 | 0.25 | 0.92 | 1.17 | 0.1 | 0.02 | — | — | 0.03 | 95.2 | >600 | 1.1 |

TABLE 2

| | Oxides of major elements | | | | CaO + MgO | Oxides of elements other than major elements | | | | | Relative | Durability | Adhesion |
|---|---|---|---|---|---|---|---|---|---|---|---|---|---|
| | $Al_2O_3$ | $SiO_2$ | MgO | CaO | (wt %) | $Na_2O$ | $K_2O$ | $Fe_2O_3$ | $TiO_2$ | total | density(%) | (Hr) | (kg/mm$^2$) |
| Comparative samples | | | | | | | | | | | | | |
| C1 | *90.30 | 7.86 | 0.92 | 0.92 | *1.84 | 0.20 | 0.06 | — | — | *0.26 | 94.5 | 480 | *2.0 |
| C2 | 91.50 | 6.80 | 0.80 | 0.90 | 1.70 | 0.20 | 0.04 | — | — | *0.24 | 95.5 | 510 | 1.9 |
| C3 | 92.50 | 5.66 | 0.92 | 0.92 | *1.84 | 0.15 | 0.04 | — | — | 0.19 | 95.3 | 520 | 1.9 |
| C4 | 91.90 | 7.80 | *0.18 | *0.12 | *0.30 | 0.14 | 0.04 | — | — | 0.18 | 94.3 | 510 | 1.9 |
| C5 | 93.16 | 5.34 | *1.40 | *0.10 | 1.50 | 0.14 | 0.04 | — | — | 0.18 | 96.1 | 180 | 0.6 |
| C6 | 93.16 | 5.34 | *0.10 | *1.40 | 1.50 | 0.08 | 0.02 | — | — | 0.10 | 96.0 | >600 | 0.2 |
| C7 | *97.20 | 2.00 | 0.40 | 0.40 | 0.80 | 0.04 | 0.01 | — | — | 0.05 | 91.2 | >600 | 0.2 |

TABLE 3

| | Oxides of major elements | | | | Mgo + CaO | Rare earth elements, etc. | | Oxides of elements other than major elements | | | | |
|---|---|---|---|---|---|---|---|---|---|---|---|---|
| | Al$_2$O$_3$ | SiO$_2$ | MgO | CaO | (wt %) | (A)* | (B)* | Na$_2$O | K$_2$O | Fe$_2$O$_3$ | TiO$_2$ | total |
| Samples | | | | | | | | | | | | |
| 12 | 93.40 | 5.45 | 0.23 | 0.92 | 1.15 | Y$_2$O$_3$:4.75 | 5.0 | 0.04 | 0.03 | 0.04 | 0.01 | 0.12 |
| 13 | 93.40 | 5.45 | 0.23 | 0.92 | 1.15 | ZrO$_2$:4.75 | 5.0 | 0.04 | 0.03 | 0.04 | 0.01 | 0.12 |
| 14 | 93.40 | 5.45 | 0.23 | 0.92 | 1.15 | HfO$_2$:4.75 | 5.0 | 0.04 | 0.03 | 0.04 | 0.01 | 0.12 |
| 15 | 93.40 | 5.45 | 0.23 | 0.92 | 1.15 | Nb$_2$O$_3$:2.91 | 3.0 | 0.04 | 0.03 | 0.04 | 0.01 | 0.12 |
| 16 | 93.40 | 5.45 | 0.23 | 0.92 | 1.15 | Ta$_2$O$_3$:2.91 | 3.0 | 0.04 | 0.03 | 0.04 | 0.01 | 0.12 |
| 17 | 93.40 | 5.45 | 0.23 | 0.92 | 1.15 | ZrO$_2$:0.97 + HfO$_2$:1.94 | 3.0 | 0.04 | 0.03 | 0.04 | 0.01 | 0.12 |
| 18 | 93.40 | 5.45 | 0.23 | 0.92 | 1.15 | Y$_2$O$_3$:11.49 | 13.0 | 0.035 | 0.030 | 0.035 | 0.010 | 0.110 |
| 19 | 93.40 | 5.45 | 0.23 | 0.92 | 1.15 | Y$_2$O$_3$:4.42 + ZrO$_2$:7.07 | 13.0 | 0.035 | 0.030 | 0.035 | 0.010 | 0.110 |
| 20 | 93.40 | 5.45 | 0.23 | 0.92 | 1.15 | Y$_2$O$_3$:0.50 | 0.5 | 0.04 | 0.03 | 0.04 | 0.01 | 0.12 |
| 21 | 93.40 | 5.45 | 0.23 | 0.92 | 1.15 | ZrO$_2$:0.30 | 0.3 | 0.04 | 0.03 | 0.04 | 0.01 | 0.12 |
| 21A | 93.40 | 5.45 | 0.92 | 0.23 | 1.15 | Y$_2$O$_3$:1.96 | 2 | 0.04 | 0.05 | 0.08 | 0.03 | 0.20 |
| 21B | 93.40 | 5.45 | 0.92 | 0.23 | 1.15 | ZrO$_2$:1.96 | 2 | 0.04 | 0.02 | 0.02 | — | 0.08 |
| 21C | 93.40 | 5.45 | 0.92 | 0.23 | 1.15 | HfO$_2$:1.96 | 2 | 0.01 | 0.02 | 0.02 | — | 0.05 |
| 21D | 93.40 | 5.45 | 0.92 | 0.23 | 1.15 | CrO:0.50 | 0.50 | 0.04 | 0.03 | 0.05 | — | 0.12 |
| Comparative Samples | | | | | | | | | | | | |
| C8 | 93.40 | 5.45 | 0.23 | 0.92 | 1.15 | Y$_2$O$_3$:0.08 | *0.08 | 0.04 | 0.03 | 0.04 | 0.01 | 0.12 |
| C9 | 93.40 | 5.45 | 0.23 | 0.92 | 1.15 | Y$_2$O$_3$:15.21 | *18.0 | 0.034 | 0.025 | 0.034 | 0.007 | 0.100 |
| C10 | 93.40 | 5.45 | 0.23 | 0.92 | 1.15 | Y$_2$O$_3$:8.46 + ZrO$_2$:6.75 | *18.0 | 0.034 | 0.025 | 0.034 | 0.007 | 0.100 |

N.B. : *(A) of rare earth element, etc. represents wt % relative to 100 wt % of the ceramic.
*(B) represents wt % relative to the total 100 wt % of oxides of major elements.

TABLE 4

| | Relative density (%) | Durability (Hr) | Adhesion (kg/mm$^2$) |
|---|---|---|---|
| Samples | | | |
| 12 | 95.7 | >700 | 1.9 |
| 13 | 95.8 | >700 | 1.9 |
| 14 | 95.0 | >700 | 1.9 |
| 15 | 94.7 | >700 | 1.8 |
| 16 | 94.8 | >700 | 1.9 |
| 17 | 95.0 | >700 | 1.9 |
| 18 | 96.0 | >700 | 2.0 |
| 19 | 97.2 | >700 | 2.0 |
| 20 | 96.1 | >700 | 1.8 |
| 21 | 96.4 | >700 | 1.8 |
| 21A | 95.5 | >700 | 2.1 |
| 21B | 95.0 | >700 | 2.0 |
| 21C | 95.8 | >700 | 2.1 |
| 21D | 97.0 | >700 | 2.0 |
| Comparative Samples | | | |
| C8 | 95.1 | >700 | 1.7 |
| C9 | 92.3 | 41 | 0.8 |
| C10 | 91.5 | 43 | 0.9 |

TABLE 5

| | Oxides of major elements | | | | CaO + MgO | Oxides of elements other than major elements | | | | | Heater resistance | Applied voltage |
|---|---|---|---|---|---|---|---|---|---|---|---|---|
| | Al$_2$O$_3$ | SiO$_2$ | MgO | CaO | (wt %) | Na$_2$O | K$_2$O | Fe$_2$O$_3$ | TiO$_2$ | total | ($\Omega$) | (V) |
| Samples | | | | | | | | | | | | |
| 22 | 93.40 | 5.45 | 0.23 | 0.92 | 1.15 | 0.04 | 0.03 | 0.04 | 0.01 | 0.12 | 4.5 | 14.5 |
| | | | | | | | | | | | 5.2 | 24.0 |
| | | | | | | | | | | | 6.0 | 28.0 |
| | | | | | | | | | | | 6.7 | 35.0 |
| 23 | 92.96 | 5.34 | 0.78 | 0.92 | 1.70 | 0.04 | 0.03 | 0.04 | 0.02 | 0.13 | 4.5 | 14.5 |
| | | | | | | | | | | | 5.2 | 24.0 |
| | | | | | | | | | | | 6.0 | 28.0 |
| | | | | | | | | | | | 6.7 | 35.0 |
| 24 | 95.07 | 3.63 | 0.89 | 0.41 | 1.30 | 0.04 | 0.03 | 0.04 | — | 0.11 | 4.5 | 14.5 |
| | | | | | | | | | | | 5.2 | 35.0 |

TABLE 5-continued

| | Oxides of major elements | | | | CaO + MgO | Oxides of elements other than major elements | | | | | Heater resistance | Applied voltage |
|---|---|---|---|---|---|---|---|---|---|---|---|---|
| | $Al_2O_3$ | $SiO_2$ | MgO | CaO | (wt %) | $Na_2O$ | $K_2O$ | $Fe_2O_3$ | $TiO_2$ | total | (Ω) | (V) |
| Comparative samples | | | | | | | | | | | | |
| C11 | 90.30 | 7.86 | 0.92 | 0.92 | 1.84 | 0.20 | 0.06 | — | — | 0.26 | 4.5 | 14.5 |
| C12 | | | | | | | | | | | 5.2 | 24.0 |
| C13 | 93.16 | 5.34 | 1.40 | 0.10 | 1.50 | 0.14 | 0.04 | — | — | 0.18 | 4.5 | 14.0 |
| C14 | | | | | | | | | | | 6.0 | 28.0 |

Compositions of No. 22, 23, and 24 correspond to No. 1, 2 and 3 of Table 1, respectively.
Compositions of Nos. C11 and C12, and Nos. C13 and 14 correspond to No. C1 and No. C6 of Table 2, respectively.

TABLE 6

| | Relative density (%) | Durability (Hr) | Adhesion (kg/mm²) |
|---|---|---|---|
| Samples | | | |
| 22 | 96.0 | >600 | 2.7 |
| 23 | 95.7 | >600 | 1.8 |
| 24 | 96.4 | >600 | 1.5 |
| Comparative samples | | | |
| C11 | 94.5 | 430 | 1.9 |
| C12 | 94.5 | 470 | 1.9 |
| C13 | 96.1 | 170 | 0.5 |
| C14 | 96.1 | 190 | 0.5 |

What is claimed is:

1. An alumina-based sintered material for a ceramic heater wherein the ceramic heater comprises a resistance heater embedded in the sintered material, and, based on an amount of $Al_2O_3$, $SiO_2$, MgO and CaO totalling 100 wt %, the sintered material consists essentially of:

(A) 91 to 97 wt % of $Al_2O_3$, 1 to 8 wt % of $SiO_2$, 0.2 to 1.2 wt % of MgO, and 0.2 to 1.2 wt % of CaO, with MgO and CaO in total amounting to 0.4 to 1.8 wt %;

(B) an oxide of at least one element selected from the group consisting of Na, K, Fe, and Ti, and which oxide is present at a level of not more than 0.2 wt %;

(C) 0.1 to 15 wt % of at least one oxide of an element selected from the group consisting of rare earth elements, group IVa excluding Ti, group Va and group VIa of the Periodic Tables and (D) 0.3 to 13% by weight of at least one oxide of an element selected from the group consisting of Zr, Y, Hf, Nb and Ta.

2. The alumina-based sintered material for a ceramic heater as defined in claim 1, wherein a ceramic heater manufactured using said sintered material has a durability amounting to 700 hours or more, in terms of the time elapsed until breakage of the ceramic heater when the resistance heater is electrically heated to a surface temperature of 1100° C. in an ambient atmosphere, by current conduction through the resistance heater, and the adhesive strength of a terminal of the resistance heater bonded with a brazing material is not lower than 1.75 kg/mm².

3. An alumina-based sintered material for a ceramic heater wherein the ceramic heater comprises a resistance heater having a terminal and embedded in the sintered material, and, based on an amount of $Al_2O_3$, MgO and CaO totaling 100 wt %, the sintered material consists essentially of:

(A) 91 to 97 wt % of $Al_2O_3$, 1 to 8 wt % of $SiO_2$, 0.2 to 1.2 wt % of MgO and 0.2 to 1.2 wt % of CaO, with MgO and CaO in total amounting to 0.4 to 1.8 wt %;

(B) at least one element or oxide of an element selected from the group consisting of Na, K, Fe, and Ti, which element or oxide of an element is present at a level of no more than 0.2 wt %; and (C) 0.3 to 13 wt % of at least one oxide of an element selected from the group consisting of Zr, Y, Hf, Nb and Ta, wherein upon electrically heating a ceramic heater comprising the sintered material and a resistance heater to a surface temperature of 1100° C. in an ambient atmosphere by current conduction through the resistance heater, the ceramic heater has a durability of 600 hours or more of time elapsed until breakage of the heater, and the terminal of the resistance heater is bonded with a brazing material to have an adhesive strength of not lower than 1.0 kg/mm².

4. The alumina-based sintered material for ceramic heater as defined in claim 1 wherein, based on the total amount of $Al_2O_3$, $SiO_2$, MgO and CaO of 100 wt %, the sum of the amounts of MgO and CaC is 1.1 to 1.8 wt %, with the adhesive strength being not lower than 1.5 kg/mm².

5. The alumina-based sintered material for ceramic heater as defined in claim 1 wherein said components A are present in an amount of 0.03 to 0.2 wt % calculated as oxides.

6. A ceramic heater comprising an alumina-based sintered material as defined in claim 1, 2, 3, 4 or 5.

* * * * *